(12) United States Patent
Harke

(10) Patent No.: US 6,822,418 B2
(45) Date of Patent: Nov. 23, 2004

(54) POSITION ESTIMATION AND DEMAGNETIZATION DETECTION OF A PERMANENT MAGNET MOTOR

(75) Inventor: Michael Harke, Madison, WI (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 10/645,296

(22) Filed: Aug. 21, 2003

(65) Prior Publication Data

US 2004/0128105 A1 Jul. 1, 2004

Related U.S. Application Data

(60) Provisional application No. 60/405,664, filed on Aug. 23, 2002, and provisional application No. 60/408,520, filed on Sep. 4, 2002.

(51) Int. Cl.[7] ................................................. H02P 5/28
(52) U.S. Cl. ........................ 318/807; 318/700; 318/727
(58) Field of Search ............................... 318/807, 700, 318/727; 356/318; 363/71

(56) References Cited

U.S. PATENT DOCUMENTS 5,818,582 A   10/1998   Fernandez et al. .......... 356/318

2002/0027791 A1 * 3/2002 Yoshioka et al. ............. 363/71
2003/0052642 A1 * 3/2003 Kerkman et al. ........... 318/801

OTHER PUBLICATIONS

PCT International Search Report Dated Dec. 18, 2003.

* cited by examiner

*Primary Examiner*—Karen Masih
(74) *Attorney, Agent, or Firm*—Ostrolenk, Faber, Gerb & Soffen, LLP

(57) ABSTRACT

A feedback response signal in a motor drive system in response to injection of a high frequency carrier signal provides information for determining motor position and demagnetization detection. The high frequency carrier signal excitation can be voltage or current based. The feed back signal is processed with various filtering techniques and phase detection to obtain the desired information. Both uniform and localized demagnetization of the motor is detected by examining the saturation saliency of the stator iron for a lack of position dependent information or large DC offsets. The technique provides good position information for the motor while providing an indication of motor health.

15 Claims, 4 Drawing Sheets

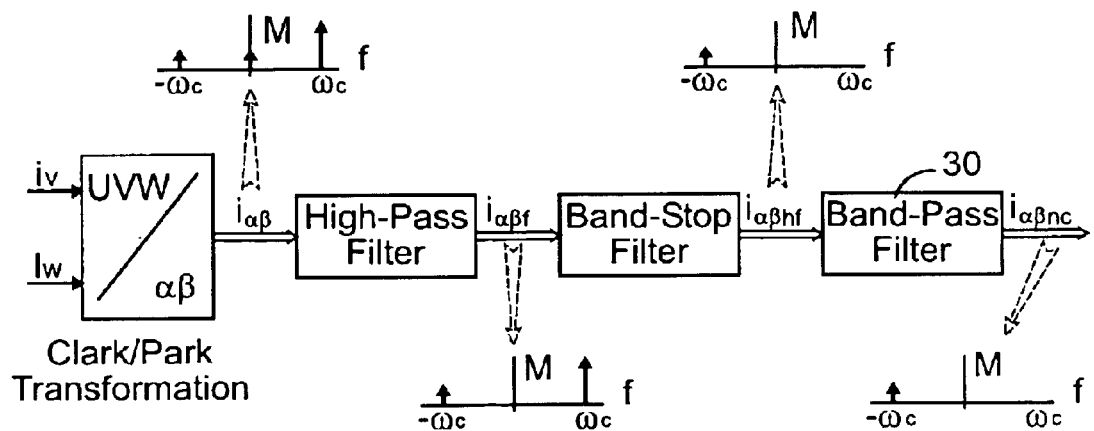
FIG. 4
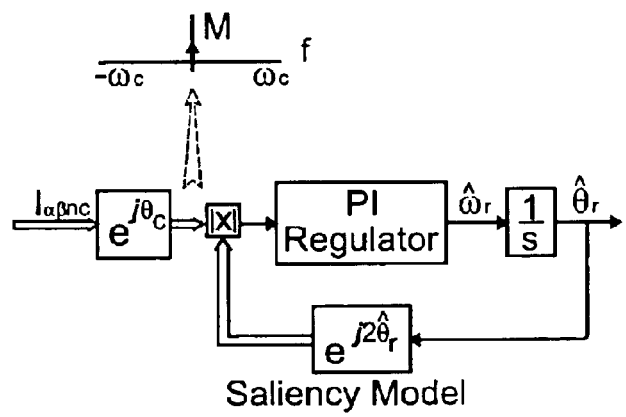
FIG. 5A
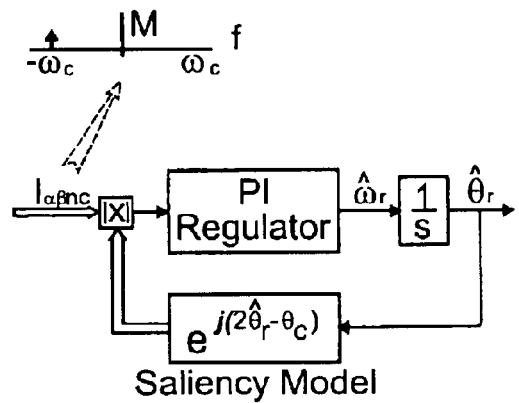
FI.G 5B

POSITION ESTIMATION AND DEMAGNETIZATION DETECTION OF A PERMANENT MAGNET MOTOR

RELATED APPLICATIONS

This application is based on and claims benefit of U.S. Provisional Application No. 60/405,664, filed on Aug. 23, 2002, entitled Motor Drive Platform and U.S. Provisional Application No. 60/408,520, filed Sep. 4, 2002, entitled Motor Drive Platform, to both of which a claim of priority is hereby made.

BACKGROUND OF THE INVENTION

When starting a permanent magnet synchronous machine, knowledge of the magnet location contributes to maximizing starting torque and insuring that torque is produced in the desired direction.

The magnet orientation with respect to the applied electrical field determines both the magnitude and direction of developed torque on the rotor shaft. The developed torque is proportional to the cross product of the stator and rotor flux linkages as indicated in equation (1) below. The location of the stator flux linkage is controlled by the applied voltage to the stator, whereas the location of the rotor flux linkage is aligned with the rotor magnets. This relationship is illustrated in FIG. 1, which shows the rotor flux vector $\lambda_r$ aligned with permanent magnets and the stator flux vector $\lambda_s$ as determined by the stator voltage.

$$T_{em} \propto \lambda_s \times \lambda_r \qquad (1)$$

Typically, the initial rotor position is either determined by using hall-effect sensors to detect the permanent magnet flux or set through a starting sequence to align the magnets (rotor) in a specified position. In many applications, it is desirable to detect the rotor position without the use of additional sensors while keeping an unlocked rotor at standstill. Not only is the elimination of the hall-effect sensors cost-effective, but overall system robustness can be increased because fewer electrical connections are required.

The magnitude of the permanent magnet rotor flux is an important parameter in torque production. One problem that occurs in torque production is demagnetization of a permanent magnet resulting in less rotor flux and consequently less torque production and loss of efficiency. Permanent magnet demagnetization can be uniform over the entire rotor structure or can be localized to a specific magnet, for example. It would be advantageous to know the health (magnetization quality) of the magnets before start up of the motor drive for diagnostic purposes.

SUMMARY OF THE INVENTION

The invention relates to a method including an algorithm for estimating the initial magnet (rotor electrical) position of a permanent magnet AC machine by injecting a small high frequency carrier signal. The advantage of this signal injection method is that it can work at any initial motor condition including standstill and rotating conditions. In addition, this method permits detection of demagnetization of the rotor magnets. The invention is achieved using phase tracking techniques that have the advantage of being less sensitive to parameter variation.

Initial position of the permanent magnet rotor contributes to a controlled start of the permanent magnet AC machine. The fundamental idea of the present invention is to estimate the rotor electrical position by measuring saturation of the stator caused by the permanent magnet field on the rotor. The saturation of the stator results in a parasitic inductance variation that corresponds to the magnet position.

A related utility of the present invention involves demagnetization of the motor permanent magnets that can occur over the lifetime of the machine and during fault conditions. The carrier signal injection technique according to the present invention permits detection of demagnetization.

An object of the present invention is to estimate the initial permanent magnet rotor position with respect to the stator orientation without using additional sensors, other than those required for current control of the drive. Another objective is to determine the magnetization of the PM machine before start up, and whether demagnetization has occurred.

BRIEF DESCRIPTION OF THE DRAWINGS

The present invention is described in greater detail below, with reference to the accompanying drawings, in which:

FIG. 4 is a block diagram showing signal processing of a feedback signal;

FIGS. 5A and 5B are system block diagrams illustrating rotor flux position-based saliency tracking with a complex vector phase-locked loop;

DETAILED DESCRIPTION OF EMBODIMENTS OF THE INVENTION

Figure 1:
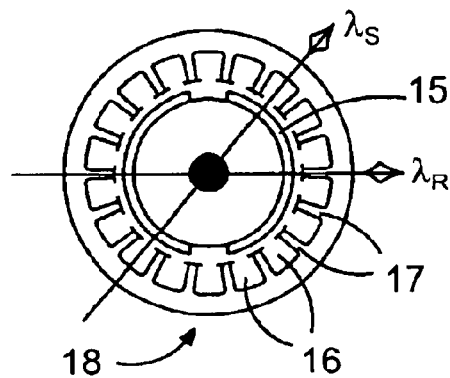
FIG. 1 is a diagram of a permanent magnet synchronous machine illustrating a rotor flux vector and a stator flux vector.

Referring now to FIG. 1, a fundamental premise of the present invention is that a field of a permanent magnet 15 causes saturation of a stator iron 17 in a permanent magnet motor 18. Saturation of stator iron 17 varies with the rotor position. This inductance is often referred to as the saliency of the stator iron. By injecting a high-frequency test signal, or carrier signal, to a stator winding 16 and measuring current, an initial position of a rotor electrical angle can be estimated using signal conditioning and processing algorithms described in greater detail below. Alternatively, a high frequency current signal can be injected into motor 18 and similar processing can be performed on resulting motor voltages to estimate initial rotor position.

A. High Frequency Machine Model

The synchronous machine can be modeled using complex vector notation in the stationary $\alpha\beta$ reference frame by equation (2), including the position dependant saliency.

$$v_{\alpha\beta} = (r_s + \bar{L}s)i_{\alpha\beta} + s(\Delta L e^{j2\theta_r} i_{\alpha\beta}^*) + j\omega_r \lambda_m' e^{j\theta_r} \qquad (2)$$

where, $r_s$ is the stator resistance, $\bar{L}$ is the mean stator inductance,

ΔL is the magnitude of salient inductance,
ω_r is the rotor electrical velocity,
θ_r is the rotor electrical position,
λ_m' is the effective permanent magnet flux,
s is the Laplace operator, and
† indicates the complex conjugate.

At high frequencies and standstill, the resistance term is negligible and the back-emf term is zero, resulting in equation (3).

$$v_{\alpha\beta} \approx \overline{L} s\, i_{\alpha\beta} + \Delta L\, e^{j2\theta_r} s\, i_{\alpha\beta}^{\dagger} \quad (3)$$

Expansion to into real and imaginary parts results in equation (4).

$$\begin{Bmatrix} v_\alpha \\ v_\beta \end{Bmatrix} \approx \begin{bmatrix} \overline{L} + \Delta L \cos(2\theta_r) & \Delta L \sin(2\theta_r) \\ \Delta L \sin(2\theta_r) & \overline{L} - \Delta L \cos(2\theta_r) \end{bmatrix} s \begin{Bmatrix} i_\alpha \\ i_\beta \end{Bmatrix} \quad (4)$$

B. Carrier Signal Excitation

Figure 2:
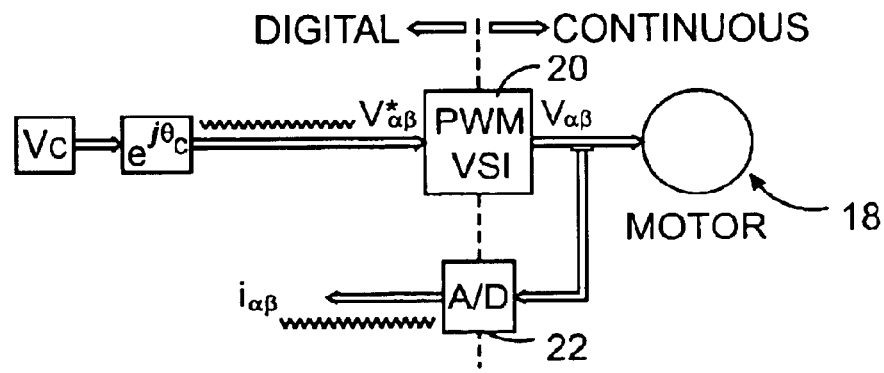
FIG. 2 is a block diagram of a high frequency carrier signal voltage excitation according to the present invention.
Figure 3:
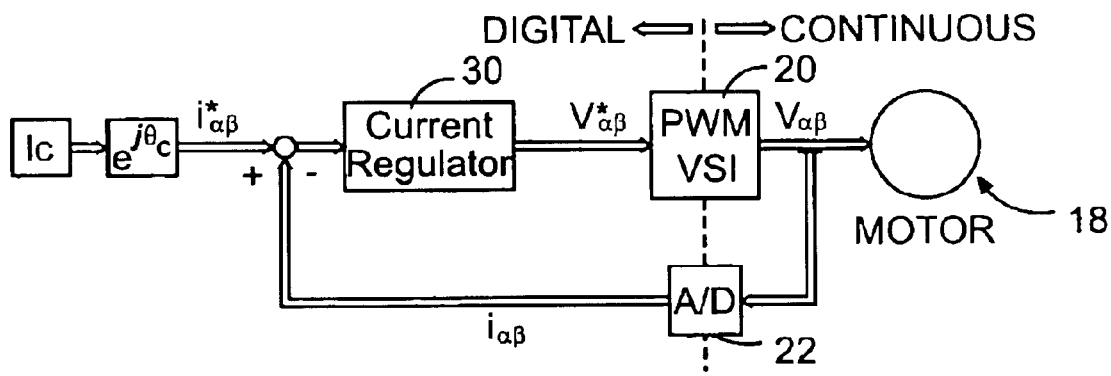
FIG. 3 is a block diagram of a high frequency carrier signal current excitation according to the present invention.

Referring now to FIGS. 2 and 3, high frequency rotating vector excitation can be used to extract the position information inherent in equation (4). This carrier signal excitation can either be voltage excitation as in FIG. 2 or current excitation as in FIG. 3. For carrier signal voltage excitation, a high frequency voltage command $V_C$ is given to motor drive 20 and the stator currents are measured and processed through an analog to digital converter (A/D) 22, resulting in feedback current signals $i_{\alpha\beta}$. For carrier signal current excitation, a high frequency current command $I_C$ is given to a current regulator 30, which provides the carrier signal to motor drive 20. The motor voltages are processed through A/D 22 to provide feedback current signals $i_{\alpha\beta}$. The motor voltages can be either measured from the stator terminals or a commanded voltage $V_{\alpha\beta}$ to motor drive 20.

For example, the carrier signal voltage excitation can be expressed as a positive rotating vector (balanced three-phase excitation) as in equation (5).

$$v_{\alpha\beta\_c} = V_c e^{j\omega_c t} \quad (4)$$

The expression in equation (5) results in a current that consists of two components: a forward rotating vector and a negative rotating vector, as shown in equation (6). The information in the forward rotating vector (positive sequence) consists of balanced conditions of the machine, such as the mean inductance or bus voltage level. The information contained in the negative rotating current vector (negative sequence) consists of the unbalanced loading and in this case is predominantly the differential inductance caused by saturation of the stator.

$$i_{\alpha\beta} = -j I_{pc} e^{j\omega_c t} + j I_{nc} e^{-j(\omega_c t - 2\theta_r)} \quad (6)$$

where, $$I_{pc} = \left[ \frac{\overline{L}}{\overline{L}^2 - \Delta L^2} \right] \frac{V_c}{\omega_c} \text{ and}$$

$$I_{nc} = \left[ \frac{\Delta L}{\overline{L}^2 - \Delta L^2} \right] \frac{V_c}{\omega_c}$$

Thus, to detect the initial position of the rotor, the negative sequence of equation (6) is extracted.

C. Signal Processing

Referring now to FIG. 4, a diagram of the signal processing used to isolate the negative sequence component is depicted. The complex Fast Fourier Transform (FFT) of the current signal at each stage is also shown to illustrate the signal contents. Only two measured currents, for example, $i_v$ and $i_w$, are used, given a three-phase system. The measured currents are transformed into equivalent two-phase currents $i_{\alpha\beta}$, shown in complex vector notation. Measured current content consists of the positive sequence component at $\omega_C$, a dc offset component and a negative sequence component $\omega_C$. The stationary frame currents are high-pass filtered to remove the dc offset ($i_{\alpha\beta f}$). Subsequently, the currents are band-stop filtered to remove the positive sequence ($i_{\alpha\beta h f}$). A final band-pass filter at the negative sequence can be used to eliminate additional noise ($i_{\alpha\beta nc}$). These filters can be implemented using any of several well known methods, and are not discussed here in detail. However, it should be apparent that other filter sequences are available, such as applying a band stop filter prior to or in conjunction with a high pass filter, and thus the invention is not limited to the specific embodiment.

D. Vector Tracking

Referring now to FIGS. 5A and 5B, in a preferred embodiment of the present invention, a complex vector Phase-Locked Loop (PLL) is used to extract position, information. In FIG. 5A, the PLL is built in the negative sequence reference frame and operates on the filtered currents $i_{\alpha\beta nc}$ after they have been transformed to the negative sequence reference frame. In FIG. 5B the PLL is constructed in the stationary reference frame, operating on the filtered currents $i_{\alpha\beta nc}$. The phase-detector of the PLL is the magnitude of the cross-product between the estimated rotor angle vector $$e^{j2\hat{\theta}_r} \text{ or } e^{j(2\hat{\theta}_r - \theta_c)}$$

(in the appropriate reference frame) and the filtered current input $i_{\alpha\beta nc}$.

E. Identification of Magnet Polarity

The present invention through the applied algorithms produces the axis of the permanent magnet flux, but the magnet polarity has not been determined. The polarity can be obtained according to the present invention in several ways. First, the magnet direction can be determined by inspecting the phase of the $2^{nd}$ harmonic of the injected signal, which is directly related to magnet polarity. Signal processing and vector tracking can be used to isolate and track the phase of the $2^{nd}$ harmonic. Second, the magnetic polarity can be determined by using test voltage pulses injected along the estimated magnetic axis determined in the first sequence. The resulting current will be greatest when the voltage pulses are injected in the direction of the north magnetic pole. The polarity is thus determined by detecting the magnitude of the resulting current.

F. Detection of Demagnetization

The effect of motor demagnetization affects the measured carrier signal in two forms. First, if the rotor has been uniformly demagnetized, the saturation saliency is minimized and there is no position dependant information in the negative sequence. In addition, the mean inductance of the motor changes This condition can be detected by the lack of negative sequence signal or by a change in the magnitude of the positive sequence. Second, if only localized demagnetization has occurred, a large dc offset will occur in the negative sequence signal, which is easily detectable.

G. Alternate Formulations

The methods outlined to this point use carrier signal voltage injection and measure the resulting current.

Conversely, these methods can also be implemented by injecting carrier signal current using a current regulated drive. In this case, either measured voltage or commanded voltage is used to track the position dependant saliency.

Figure 6:
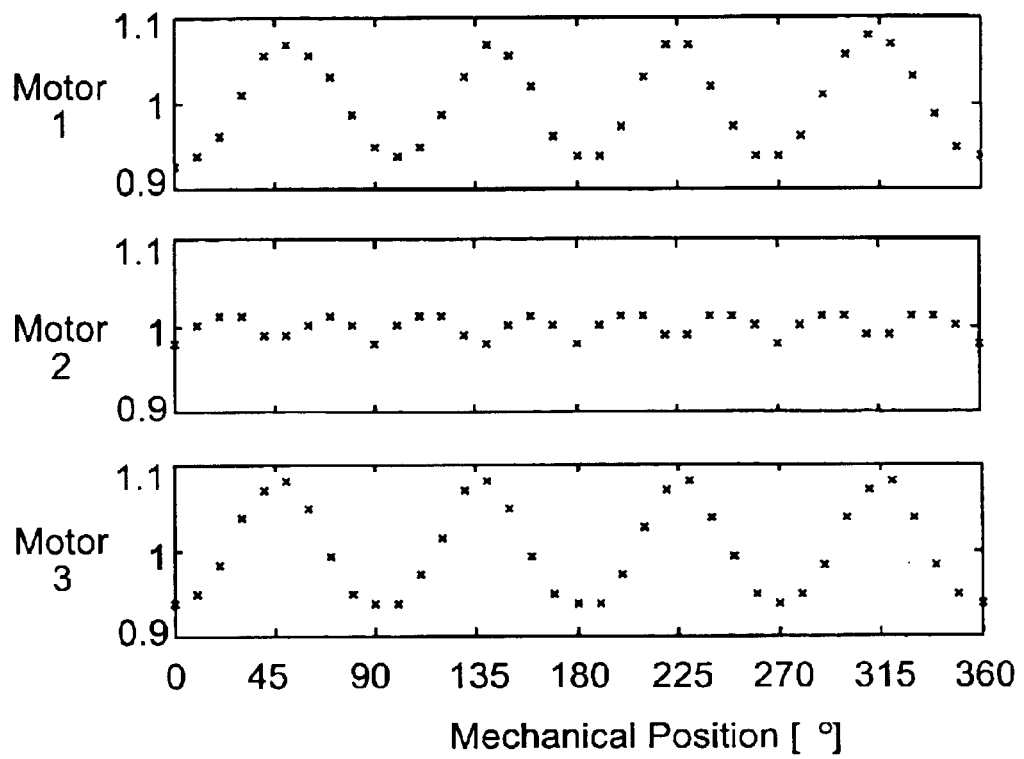
FIG. 6 is a series of graphs showing normalized motor inductance versus mechanical position.

Referring now to FIG. 6, a plot of the normalized motor inductance versus mechanical rotor position for three different permanent magnet synchronous machines is illustrated. The inductance values are normalized to the average value of inductance for the respective machine. It is apparent that the inductance varies spatially with the location of the permanent magnets.

Figure 7:
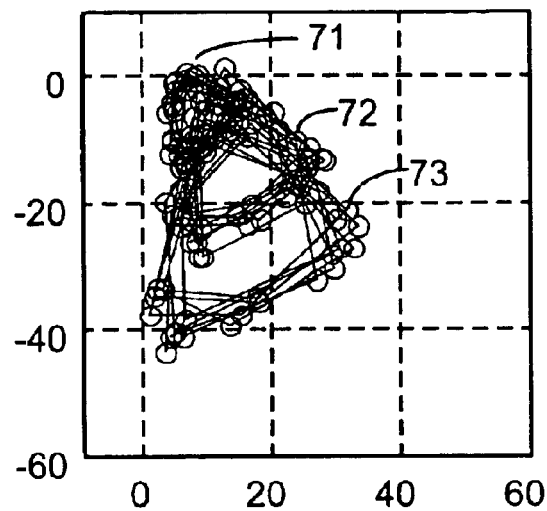
FIG. 7 is a plot showing complex currents after filtering and rotation.

Referring now to FIG. 7, an xy plot of the machine currents after signal processing and reference frame transformation for three levels of carrier signal voltage excitation is illustrated. A machine current plot 71 represents a 5V carrier signal voltage excitation level. Plots 72, 73 represent 10V and 15V carrier signal voltage excitation levels, respectively. Theoretically, the plot should be circular about the origin. The angle of the vector from the center of the image to each data point is directly related to the position of the rotor. High frequency voltage injection is used excite the motor in this test case.

Figure 8:
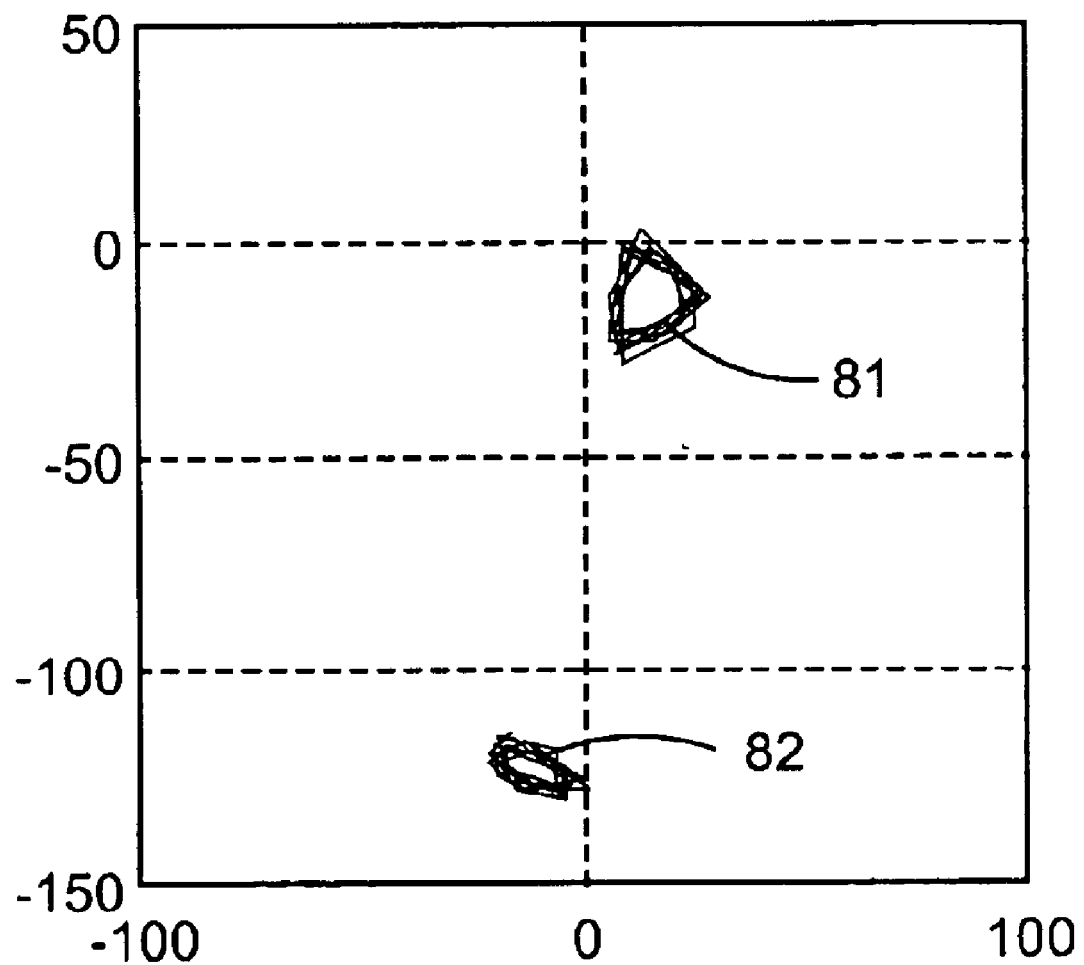
FIG. 8 is a plot showing complex currents after filtering and rotation for two motors.

Referring now to FIG. 8, an xy plot of the machine currents after signal processing and reference frame transformation for both a healthy and a demagnetized motor is illustrated. Plot 81 represents a healthy motor, while plot 82 represents a demagnetized motor. The negative sequence currents of the motor that has localized demagnetization have a large dc offset.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A system for determining the position of a permanent magnet motor, comprising:
   a carrier signal generator for generating a high frequency carrier signal;
   a motor drive coupled to the carrier signal generator and operable to receive the high frequency carrier signal and provide electrical signals to the motor related to the high frequency carrier signal;
   a feedback loop for supplying feedback signals related to motor parameters influenced by the high frequency carrier signals;
   a signal processor coupled to the feedback loop and operable to receive the feedback signal and calculate motor position based on a comparison of the high frequency carrier signal and information contained in the feedback signal.

2. The system according to claim 1, wherein the signal processor further comprises a filter for extracting the information.

3. The system according to claim 1, wherein the signal processor further comprises a complex vector phase lock loop for tracking rotor flux position based saliency.

4. A method for determining motor position in a permanent magnet synchronous motor, comprising:
   injecting a high frequency carrier signal into a motor;
   obtaining a feedback signal from the motor related to the injected high frequency carrier signal;
   extracting information from the feedback signal related to motor position; and
   analyzing the extracted information to obtain position dependent information.

5. The method according to claim 4, further comprising filtering the feedback signal to extract the position dependent information.

6. The method according to claim 4, further comprising extracting information from the feedback signal related to motor position with a complex vector phase lock loop.

7. The method according to claim 4, further comprising observing a phase of a second harmonic of the feedback signal to determine magnet polarity.

8. A method according to claim 4, further comprising injecting a voltage pulse into the motor aligned with an estimated magnetic axis; and
   measuring a current magnitude resulting from the injected voltage pulse to determine a north magnetic pole.

9. The method according to claim 4, further comprising determining a lack of position dependent information in the feedback signal to indicate uniform motor magnet demagnetization.

10. The method according to claim 4, further comprising detecting mean inductance of the motor from the feedback signal to determine uniform motor magnet demagnetization.

11. The method according to claim 4, further comprising detecting a lack of negative sequence signal in the motor feedback signal to indicate uniform motor magnet demagnetization.

12. The method according to claim 4, further comprising detecting a change in a magnitude of a positive sequence signal in the motor feedback signal to indicate uniform motor magnet demagnetization.

13. The method according to claim 4, further comprising observing a negative sequence signal in the feedback signal to determine if a large DC offset is present to indicate local motor magnet demagnetization.

14. A processor operable to execute a set of instructions to determine motor position of a permanent magnet synchronous motor, the set of instructions comprising:
   a first code section executable to inject a high frequency carrier signal into a motor;
   a second code section executable to obtain a feedback signal from the motor related to the injected high frequency carrier signal;
   a third code section executable to extract information from the feedback signal related to motor position; and
   a fourth code section executable to analyze the extracted information to obtain the position dependent information.

15. A memory device capable of storing a program of machine instructions executable to determine a position of a permanent magnet synchronous motor, the machine instructions comprising:
   a first code section for injecting a high frequency carrier signal into a motor;
   a second code section for obtaining a feedback signal from the motor related to the injected high frequency carrier signal;
   a third code section for extracting information from the feedback signal related to motor position; and
   a fourth code section for analyzing the extracted information to obtain position dependent information.

* * * * *